(12) United States Patent
Zizzamia et al.

(10) Patent No.: US 8,335,700 B2
(45) Date of Patent: *Dec. 18, 2012

(54) LICENSED PROFESSIONAL SCORING SYSTEM AND METHOD

(75) Inventors: Frank M. Zizzamia, Avon, CT (US);
John R. Lucker, Simsbury, CT (US);
Karl J. Knable, Indianapolis, IN (US)

(73) Assignee: Deloitte Development LLC, Hermitage, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/210,064

(22) Filed: Aug. 15, 2011

(65) Prior Publication Data
US 2011/0301989 A1  Dec. 8, 2011

Related U.S. Application Data

(62) Division of application No. 10/616,456, filed on Jul. 9, 2003, now Pat. No. 8,036,919.

(60) Provisional application No. 60/395,187, filed on Jul. 10, 2002.

(51) Int. Cl.
*G06Q 40/00* (2012.01)
(52) U.S. Cl. ............................. 705/4; 705/35
(58) Field of Classification Search ........................ 705/4
See application file for complete search history.

(56) References Cited

U.S. PATENT DOCUMENTS

| | | | |
|---|---|---|---|
| 4,766,539 A | 8/1988 | Fox |
| 4,831,526 A | 5/1989 | Luchs et al. |
| 4,837,693 A | 6/1989 | Schotz |
| 4,975,840 A | 12/1990 | DeTore et al. |
| 5,191,522 A | 3/1993 | Bosco et al. |
| 5,613,072 A | 3/1997 | Hammond et al. |
| 5,692,107 A | 11/1997 | Simoudis et al. |
| 5,752,236 A | 5/1998 | Sexton et al. |
| 5,774,883 A | 6/1998 | Andersen et al. |
| 5,809,478 A | 9/1998 | Greco et al. |
| 5,819,266 A | 10/1998 | Agrawal et al. |
| 5,839,113 A | 11/1998 | Federau et al. |
| 5,884,275 A | 3/1999 | Peterson et al. |
| 5,893,072 A | 4/1999 | Zizzamia |
| 5,937,387 A | 8/1999 | Summerell et al. |
| 5,956,691 A | 9/1999 | Powers |
| 5,970,464 A | 10/1999 | Apte et al. |
| 6,003,020 A | 12/1999 | Hazlehurst et al. |
| 6,009,415 A | 12/1999 | Shurling et al. |
| 6,014,632 A | 1/2000 | Gamble et al. |
| 6,038,554 A | 3/2000 | Vig |
| 6,076,072 A | 6/2000 | Libman |

(Continued)

OTHER PUBLICATIONS

Dionne, Georges, "Handbook of Insurance" Copyright 2000. Kluwer Academic Publishers Group.

(Continued)

*Primary Examiner* — Charles Kyle
*Assistant Examiner* — Seth Weis
(74) *Attorney, Agent, or Firm* — Kramer Levin Naftalis & Frankel LLP

(57) ABSTRACT

A quantitative system and method that utilizes data sources external to a company, and when available, traditional data sources, e.g., internal company information, to (i) provide for matching criteria such as, for example, demographic needs, to a database that can provide a number of potential recruits or customers and that can also be used to screen both current and prospective company employees matching the criteria, and (ii) generate a statistical model that can be used to predict future profitability and productivity of licensed professionals.

34 Claims, 4 Drawing Sheets

U.S. PATENT DOCUMENTS

| | | | |
|---|---|---|---|
| 6,128,599 | A | 10/2000 | Walker et al. |
| 6,148,297 | A | 11/2000 | Swor et al. |
| 6,173,280 | B1 | 1/2001 | Ramkumar et al. |
| 6,182,048 | B1 | 1/2001 | Osborn et al. |
| 6,236,975 | B1 | 5/2001 | Boe et al. |
| 6,456,979 | B1 | 9/2002 | Flagg |
| 6,473,084 | B1 | 10/2002 | Phillips et al. |
| 6,725,210 | B1 | 4/2004 | Key et al. |
| 7,392,201 | B1 | 6/2008 | Binns et al. |
| 2002/0116231 | A1 | 8/2002 | Hele et al. |
| 2002/0133441 | A1 | 9/2002 | Tanaka |
| 2002/0188480 | A1 | 12/2002 | Liebeskind et al. |

OTHER PUBLICATIONS

Clapp, John M., Fields, Joseph A., Ghosh, Chinomoy. "An Examination of profitablity in Spatial Markets: The Case of Life Insurance Agency Locations" Sep. 1990. Journal of Risk and Insurance. vol. 57, Iss. 3.

LICENSED PROFESSIONAL SCORING SYSTEM AND METHOD

CROSS REFERENCE TO RELATED APPLICATIONS

This application is a divisional application of U.S. patent application Ser. No. 10/616,456 filed Jul. 9, 2003 (which issued as U.S. Pat. No. 8,036,919), which claims priority to and the benefit of U.S. Provisional Application No. 60/395,187, filed Jul. 10, 2002, all of which are hereby incorporated by reference herein in their entireties.

BACKGROUND OF THE INVENTION

The present invention is directed generally to a system and method for aggregating data and predicting the profitability and productivity of licensed (e.g., by governmental agencies) professionals (e.g., insurance agents, building contractors, broker/dealers, mortgage brokers, real estate agents, financial advisors, accountants, etc.), and, more particularly, to a system and method for aggregating data from a number of public and, if available, internal or proprietary data sources to derive a predictive scoring model or algorithm that can be used to generate a score that is indicative of the future profitability and productivity of licensed professionals to be recruited, appointed, hired or otherwise selected to provide services (e.g., in the case of insurance professionals, to write insurance policies for an insurer).

The present invention has application with respect to a wide spectrum of industries and licensed professionals. However, for ease of discussion herein, the present invention is principally described in the context of the insurance industry and licensed insurance professionals, with the understanding that the present invention is not limited to the insurance industry and licensed insurance professionals.

Insurance companies use many different agency distribution systems. An agency distribution system is the network of agents or producers that includes life insurance-only agents, property and casualty agents, health insurance agents and other agents and producer entities. Within the group of life insurance-only agents, there are two primary categories: (i) exclusive or "captive" agents who represent only one insurance company or insurance brand; and (ii) independent full-time personal producers who represent more than one insurance company or insurance brand. The property and casualty agents also fall into these same two broad categories. The other agents and producer entities may include real-estate agents, automobile dealers, independent consumer products sales representatives, stock brokers, bank representatives or any business with an agent/broker sales, distribution, or producer force.

The exclusive-agent strategy involves recruiting, financing, training and housing agents, all referred to as agency-building. Within the agency-building system are general agencies or branch offices headed by either general agents or agency managers, respectively. General agents are appointed by the home office of the insurance company and operate as independent contractors for the insurance company with expense allowances paid to cover items such as rent, clerical help, travel and other office related expenses. Agency managers are employees of the insurance company and are directly supervised by the home office.

The non-agency system has several subsets, which include, brokerage companies, personal-producing general agents (PPGA's), marketing organizations and producer groups. Brokerage companies gain access through an insurance company employee, typically a brokerage supervisor, who is authorized to appoint brokers for the insurance company. PPGA companies gain access through either (i) an insurance company employed regional director, (ii) independent contractors known as managing general agents (MGAs), or (iii) direct contracting through advertising media. Marketing organizations are independent organizations through which the entire distribution function is delegated. Producer groups consist of high-producing agents who agree to place a minimum amount of business with a company in return for a share of the profits, normally through a reinsurance agreement or stock purchase option.

Within the property casualty insurance industry, the distribution strategy is very similar to that of the life insurance industry. Distribution often varies by the type of specialty coverage and the types of subcoverages within the major lines of coverage.

The problem of recruiting, hiring and appointing new insurance agents is challenging, often requiring extensive time and monetary commitments during the process. The difficulties with finding the right composition of technical and marketing skills are compounded by real world marketplace pressures such as the need to maintain an "ease-of-business-use" process with the agents, and the high levels of compensation offered by competitors attempting to attract the most productive and profitable agents.

In the insurance industry, there are several approaches used in attracting and retaining the highest quality agents. One approach is to identify the most profitable and productive agents and directly offer the most generous compensation package available. A second approach is to advertise through the mass media and attempt to attract the best agents by an interview and testing process. Still another method is to hire all comers and hope to retain the best 15% or so over the following five years.

Under the first approach, the act of recruiting an agent is based on the innate desire of agents to achieve the highest monetary rewards. Identifying agents based on these criteria is not always as measurable and predictable as an insurance company might desire. Under the second approach, the target marketing attracts those who are actively looking for a new agent/insurance company relationship. This method does not always attract the highest quality individual agent; that is, those who are the best producers are less likely to be actively looking for a change in agent and insurance company affiliation. The final method mentioned above entails a large expense for companies. There are costs in technology support, sales support, incentive programs, training, Insurance Marketplace Standards Association (IMSA) compliance and communication to name a few.

None of the foregoing methods incorporates a rigorous method for the identification and appointment of insurance agents to the benefit of the insurance companies. The sale of profitable insurance would result from finding more conservative and careful agents to write the business. This would result in both coverage that is more profitable and better retention of policyholders and agents.

Despite the availability of alternative methods of recruitment, the insurance industry predominantly uses traditional methods of targeting and attraction. Such traditional techniques have not resulted in any marked increase in agent retention over the last twenty years. The agent selection and appointment system has relied on business practices that are very informal and traditionally lax. The appointment system and method that is in wide use within the insurance industry today is predicated on a model developed from traditional practices that rely on subjective analysis of a series of personal interviews, resumes and application forms. Little emphasis is placed on using a scientific method to assess the potential or future profitability and productivity of insurance professionals (agents/brokers/producers).

In addition, the insurance industry has not effectively included the use of external data sources in the determination of agents' potential or future success rates. External data offers one of the best opportunities to obtain the characteristics of the business and or the practices of the agent to be appointed, which in turn would be essential for matching the correct company culture identifiers. While insurance companies have occasionally looked to external data sources to supplement their conventional hiring practices, the use of any such external data source has been at best haphazard, inconsistent, and relegated to a final, subjective perspective. In the insurance industry, these practices have resulted in methods that, although occasionally using external data sources, are generally specific to the data and business practices of a particular insurance company and have not been applied in a consistent and statistically rigorous fashion.

Ideally, an insurance company would appoint an agent based on the agent's ability to produce future profits and increase productivity for the insurance company, i.e., the appointment should be a function of the future profit potential of the business brought to the insurance company or future productivity of the producing agent. Such potential profit drivers cannot be known in advance, hence the introduction of risk in the appointment and recruitment process. The more accurate the assessment of a producer's productivity and profitability, the more certain the choice of the individual insurance agent being appointed. The agent/broker/producer recruitment process of the insurance company should account for this risk so that more effort is placed on recruiting those insurance agents who are deemed to have the highest propensity for future profitability and productivity, while less effort is spent on those high-risk agents who are not likely to generate high profits or be productive.

Accordingly, a need exists for a system and method that perform a complete profitability and productivity evaluation for producers that does not rely exclusively on conventional recruiting and hiring methodologies and practices (e.g., in the insurance industry). A still further need exists for such a system and method that extends conventional methodologies (e.g., insurance industry methodologies) to quantitatively include producers' characteristics and business practices, and other non-traditional-based characteristics. A still further need exists for such a quantitative system and method that utilize external data sources to generate a unique statistical model that is predictive of future profitability and productivity of producers (e.g., insurance agents, brokers and producers.) Desirably, the statistical model may also utilize a particular company's (e.g., insurance company's) internal data, business practices, and particular corporate culture to further improve the predictiveness of the model.

SUMMARY OF THE INVENTION

Generally speaking, the present invention is directed to a quantitative system and method that employs external data sources (e.g., publicly-available external data sources), and internal company data, if such data are available, to accurately and consistently predict the future profitability and productivity of licensed professionals.

For ease of discussion herein, the present invention is principally described in the context of the insurance industry and licensed insurance professionals. It should be understood, however, that the present invention is not limited to such industry and licensed professionals.

As a preliminary step to constructing a predictive model and gathering external and internal data, publicly available information on licensed producers is gathered from various governmental sources. Currently, insurance agent data are not available from a single source. In the United States, every state seems to have a different method for storing and distributing this data. As part of the present invention, the data received in various formats are cleansed through a number of algorithms and cleansing routines to develop a nationwide database of licensed agents. By using a database aggregated from the state regulatory divisions that track agent licensing, a single source database is created that can be used by all companies. To this database, as described below, additional data are appended from other data providers that are deemed pertinent to identifying productive and profitable agents. This database will hereafter be referred to as the global producer database. For a specific company, data that are unique to that company's internal records may also be appended in the database.

According to the present invention, there is created a global producer database and a predictive statistical model that can generate a score representative of the profitability and productivity of a new, or existing, producer. The method according to the present invention includes the steps of (i) gathering historical producer data from one of a number of sources, e.g., a representative group of insurance company's historical producer data, an insurance industry organization's aggregated producer data from member companies, public sources such as state insurance departments which may maintain historical data required by statutory reporting requirements, and the like, and then storing such historical producer data in a proprietary database; (ii) identifying external data sources having a plurality of external variables potentially predictive of profitability, each variable having at least two values; (iii) normalizing the historical producer data using actuarial transformations to generate working data which may also include the creation of new variables which are combinations of variables from the data sources; (iv) calculating a profitability ratio for each producer in the database using the working data; (v) using the working data to calculate a cumulative ratio for each potentially predictive external variable value; (vi) analyzing one or more external variables to identify significant statistical relationships between the one or more external variables and the cumulative ratio; (vii) identifying and choosing predictive external variables based on statistical significance and the determination of highly experienced actuaries and statisticians; (viii) developing a statistical model that utilizes the various predictive variables to develop an overall prediction of producer productivity and profitability; and (ix) scoring new or existing producers using the predictive statistical model as developed herein.

In accordance with another aspect of the present invention, the external sources are selected from a group comprised of business level databases (e.g., Dun & Bradstreet and Experian), zip code level census data (as provided by the U.S. government or third party sources), and business owner household level demographics data (e.g., Acxiom and INFO-USA). If internal company data are included in the external data sources, they too are selected. In accordance with yet another aspect of the invention, in the insurance industry context, the database includes historical insurance premium, insurance commission, insurance loss data and insurance policy counts on a plurality of producers from one or more of the possible historical producer data sources.

Accordingly, it is an object of the present invention to provide a system and method that employ data sources external to a company and, when available, traditional data sources, e.g., internal company information, to develop a global producer database and a statistical model that is predictive of the future profitability and productivity of licensed professionals. This database and statistical model use external data to provide data sources and predict with a high degree of accuracy and consistency individual producer profitability unique to the internal business practices and internal data of, for example, a particular insurance provider.

Still other objects and advantages of the present invention will in part be obvious and will in part be apparent from the specification.

The present invention accordingly comprises the various steps and the relation of one or more of such steps with respect to each of the others, and the system embodies features of construction, combinations of elements, and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is made to the following description, taken in connection with the accompanying drawings, in which.

DETAILED DESCRIPTION OF THE PREFERRED EMBODIMENTS

The present invention is directed to a quantitative method and system that employ data sources external to a company and, when available, traditional data sources (e.g., internal company information) to develop a database used for various business purposes (e.g., recruiting or sales purposes) and to generate a statistical model that can be used to predict future profitability and productivity of licensed professionals (the "predictive statistical model"). The database is based on aggregating publicly available governmental license databases and appending data from other public sources. The statistical model may be based on multivariate methods or other comparable statistical algorithmic approaches. Subsequent descriptions herein will utilize a multivariate statistical approach as the basis for the description of the underlying methodology of developing the model and its associated structure.

As indicated above, for ease of discussion, the present invention is herein described in the context of the insurance industry and licensed insurance professionals. It should be understood, however, that application of the present invention is not limited to such industry and professionals.

Figure 1A:
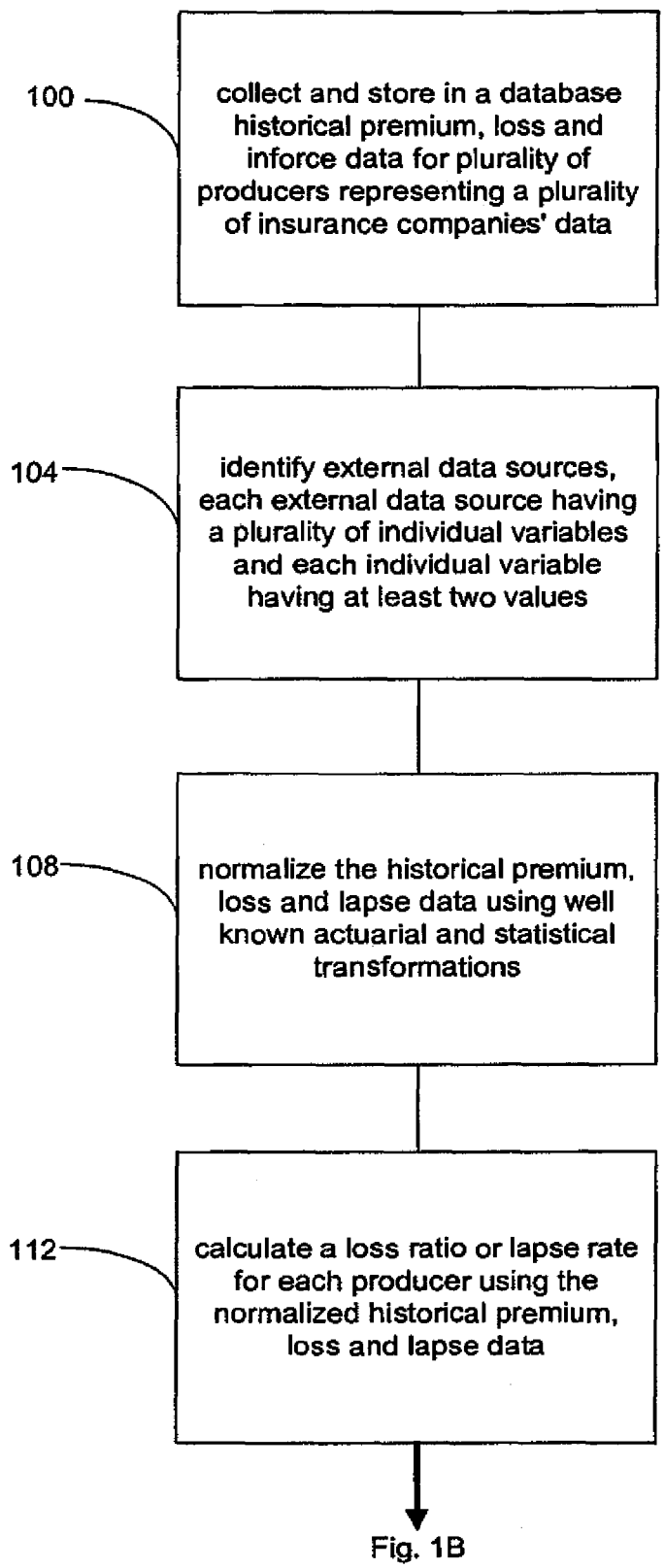
FIGS. 1A and 1B are flow diagrams depicting the steps carried out in gathering the data from various sources, actuarially transforming producer data and identifying predictive external variables preparatory to developing a statistical model that predicts individual insurance producer profitability and productivity in accordance with a preferred embodiment of the present invention.
Figure 1B:
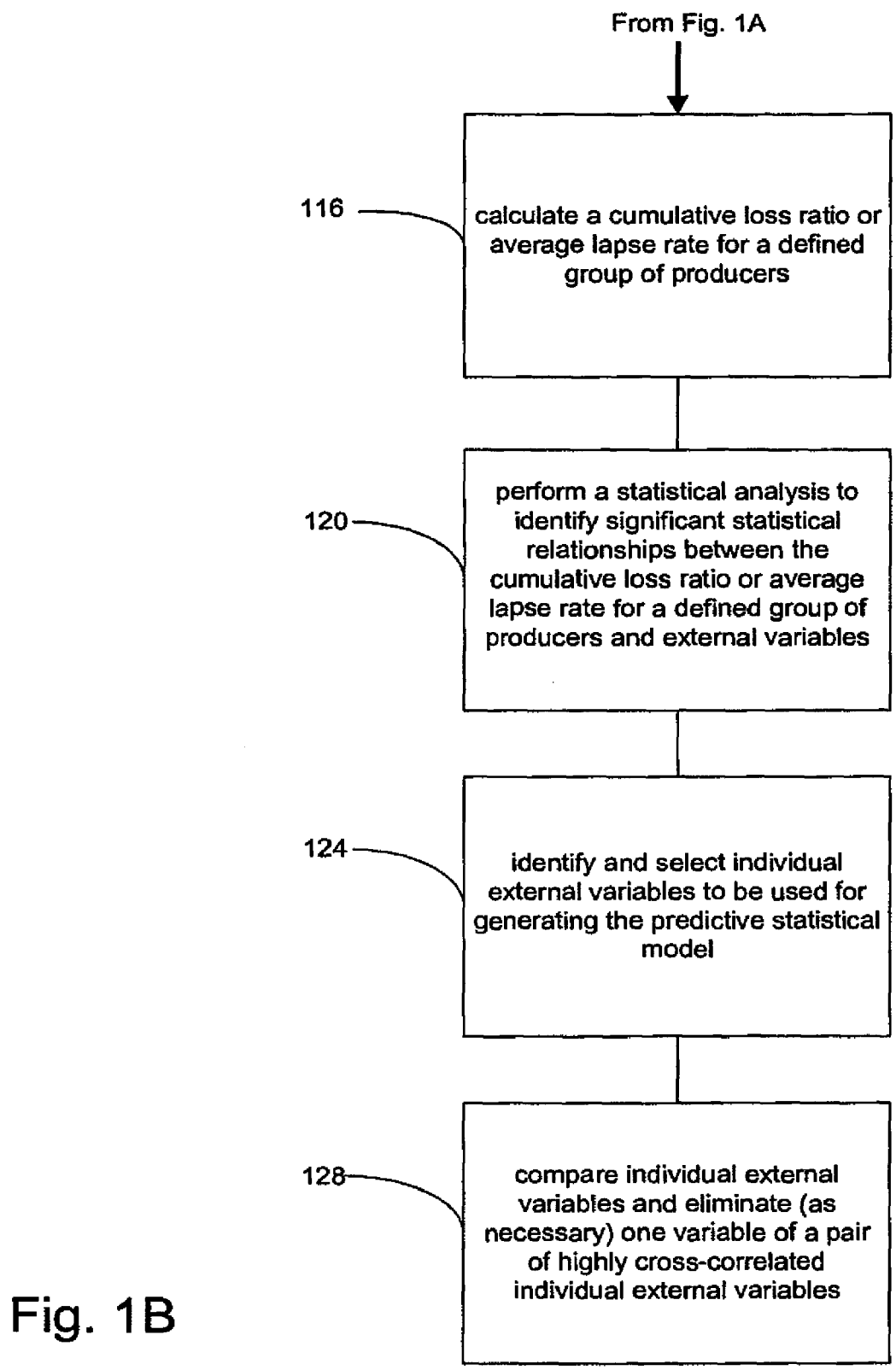

Reference is first made to FIGS. 1A and 1B which generally depict the steps in the process preparatory to developing the database and the statistical predictive model based on historical insurance producer data and associated external data. To begin the process, state agent information is gathered and the various processes needed to pull the agent name, address, license number, expiration date and initial license date are applied and the results are stored in the global producer database. In addition, the historical premium, commission and insured data for a plurality of producers are collected from a representative group of one or more data sources and stored in a global producer database in step 100 as producer records. The premium, commission and insured data are typically available from internal data sources and may be aggregated for a number of companies or may be used for a specific company. Next, in step 104, a number of external data sources having a plurality of variables, each variable having at least two values, are identified for use in appending the database and for generating the predictive statistical model.

All collected data, including the historical insurance producer data, may be stored on a relational database (as are well known and provided by, for example, IBM, Microsoft Corporation, Oracle and the like) associated with a computer system running the computational hardware and software applications necessary to generate the predictive statistical model. The computer system preferably includes a microprocessor, memory, storage medium, input devices (e.g., keyboard, mouse), and a monitor. The system may be operated using a conventional operating system and preferably includes a graphical user interface for navigating and controlling various computational aspects of the present invention.

In step 108, the historical producer premium and profitability data are normalized using actuarial transformations. The normalized data ("work data") including normalized premium data ("premium work data") and normalized profit data ("profit work data") are associated with the data sources to help identify external variables predictive of profitability from the external data sources. Insurance company internal data, when available, is also included in the normalized work data in order to customize a scoring model to a particular insurer. The internal company data might include information such as start date, number of years as a high or low producer, continuing education credits, and size of in-force block.

As an initial step in this process, a loss ratio (for a property and casualty company) and lapse rate (for a life company) is calculated from each producer's premium work data and profit work data, in step 112. The loss ratio is defined as the ratio of losses to premiums for a specific policy term, i.e., representative of the premium and losses associated during a particular effective and expiration time period. The lapse rate is defined as one minus the persistency. Persistency is defined as the ratio of policies still in force at the end of the $13^{th}$ month over those originally issued.

Thereafter, in step 116, a cumulative loss ratio is calculated for a defined group of insurance producers. A defined group of producers may be all producers within a certain range of either profitability or persistency. The cumulative loss ratio is defined as the ratio of the sum of the loss work data for a defined group to the sum of the premium work data for the same defined group. The average lapse rate is defined as one minus the sum of all $13^{th}$ month policies to the sum of all initial policies issued. Once the cumulative loss ratio has been calculated for a defined group, a statistical analysis is performed in step 120 to identify any significant statistical relationships between the cumulative loss ratio for the defined group and one or more external variables taken from the external data sources (e.g., Acxiom). Additional statistical analysis is also performed in step 120 to identify any statistical relationships between one or more external variables taken from the external data sources that may be related to the cumulative loss ratio for the defined group as evidenced by their possible relationship to variables that are themselves known to be related to, and associated with, the cumulative loss ratio for the defined group, e.g., the loss frequency, the loss severity or the lapse rates.

With the statistical analysis completed for one or more external variables, the significance of the relationship between the one or more external variables and cumulative loss ratio for the defined group is determined by highly experienced actuaries and statisticians (the "reviewers") in step 124. This step of the process can be highly empirical in nature. Based on the critical determinations of the reviewers, individual external variables are selected for generating the predictive statistical model.

After the individual external variables have been selected by the reviewers as being significant, these variables are examined in step 128 against one another for cross-correlation. To the extent cross-correlation is present between, for example, a pair of external variables, the reviewers may elect to discard one external variable of the pair of external variables showing cross-correlation.

Figure 2A:
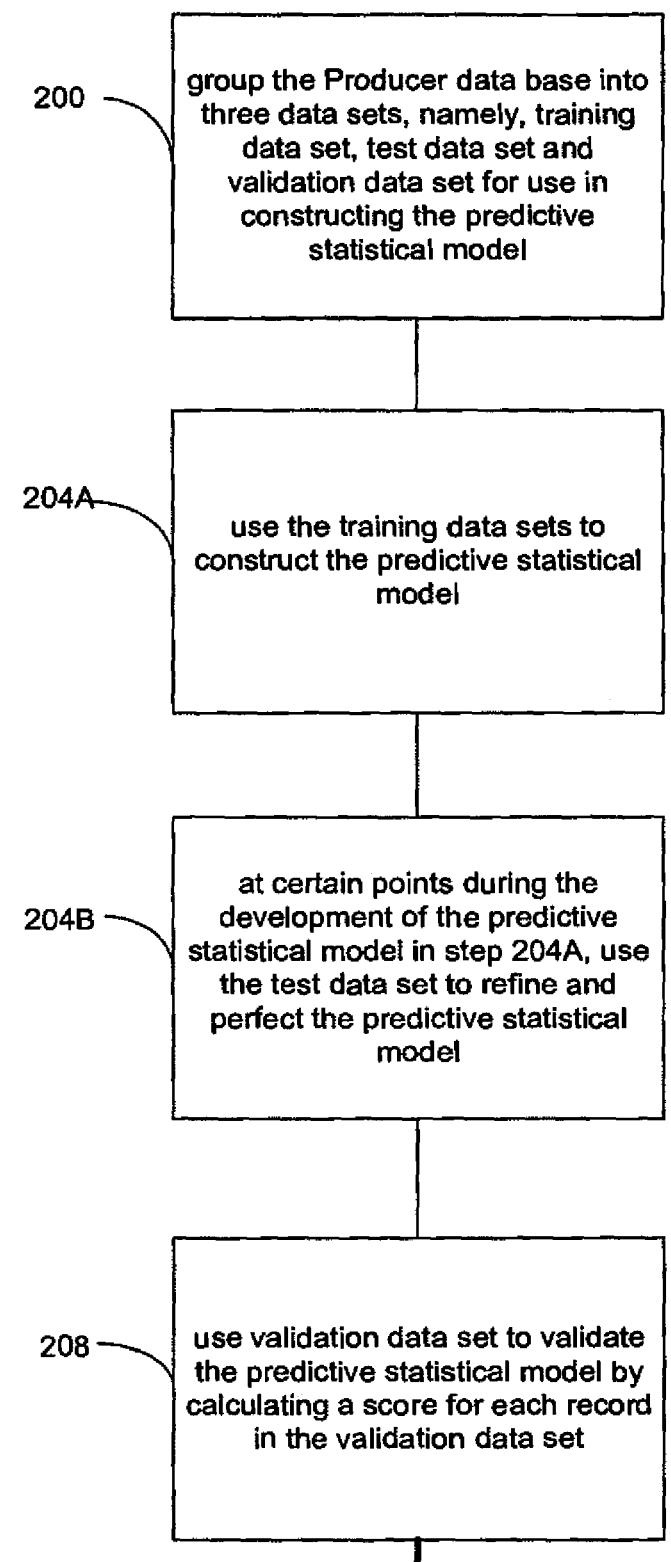
FIGS. 2A and 2B are flow diagrams depicting the steps carried out in segregating specific data, developing the statistical model and calculating a score using the statistical model that predicts individual insurance producer profitability and productivity in accordance with a preferred embodiment of the present invention.
Figure 2B:
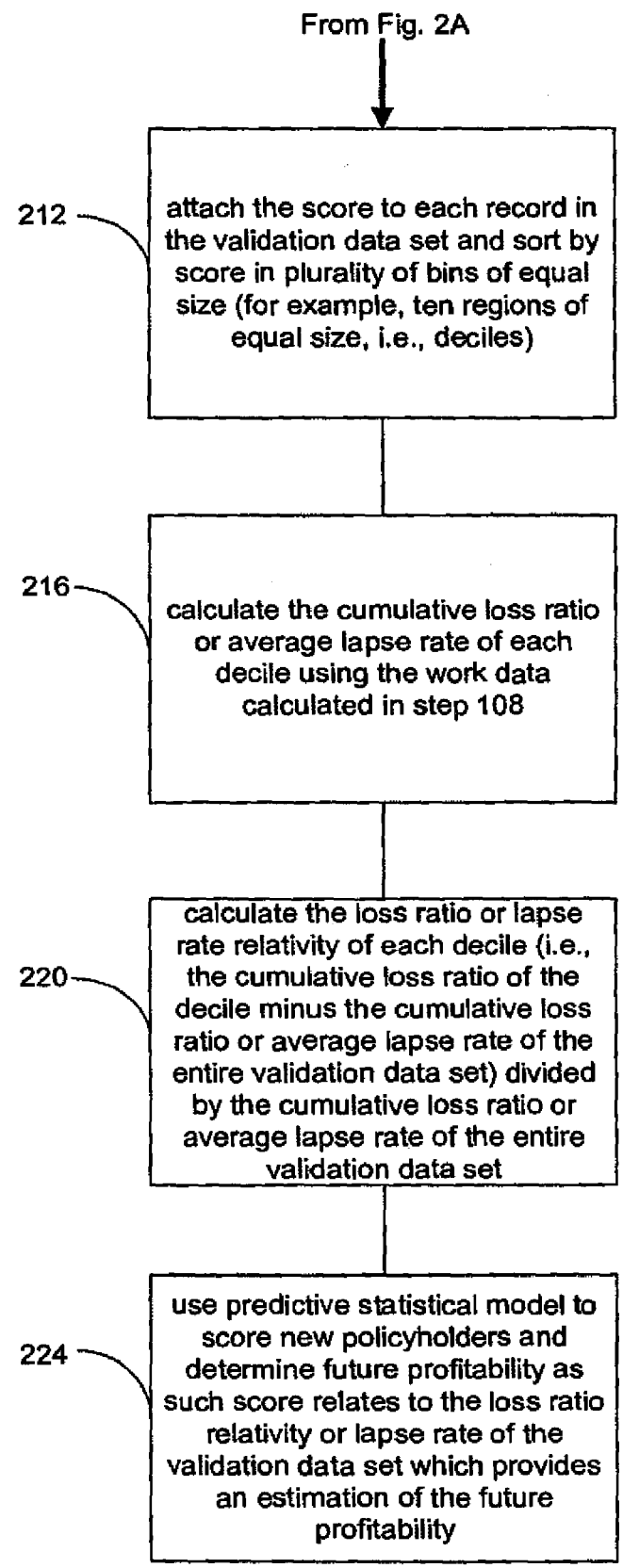

Referring now to FIGS. 2A and 2B, the steps in the process for generating the predictive statistical model based on historical and external data and score calculation are generally depicted. In step 200, the data are split into multiple separate subsets of data on a random, or otherwise statistically significant basis that is actuarially determined. More specifically, the data are split into a training data set, test data set and validation data set. This is essentially the last step before developing the predictive statistical model. At this point, the work data have been calculated and the external variables predictive of profitability and productivity have been initially defined.

As will be explained in greater detail hereinafter, the task of developing the predictive statistical model is begun using the training data set in step 204A. As part of the same process, in step 204B, the test data set is used to evaluate the efficacy of the predictive statistical model being developed with the training data set. The results from the test data set may be used at various stages to modify the development of the predictive statistical model. Once the predictive statistical model is developed, the predictiveness of the model is tested on the validation data set in steps 208-220.

More specifically, the validation data set is scored in step 208 using the predictive statistical model developed in steps 204A and 204B. In step 212, the policies in the validation data set are sorted by the score assigned to each by the predictive statistical model and divided in groups of equal size, typically ten, for example. Next, in step 216, the cumulative ratio of each region is calculated using the work data derived in step 108. In step 220, a ratio relativity for each group is calculated.

In calculating the score of a new or existing insurance producer, the predictive statistical model developed in steps 204A and 204B and validated in step 208 is used. First, the data for the predictive variables that comprise the statistical model are gathered from the global producer database. Based on these values, the predictive statistical model generates a score. This score is then gauged against one of either the loss ratio relativities or lapse rate relativities calculated in step 220 in order make a commercial insurance profitability or productivity prediction, as shown in step 224.

The steps as shown in FIGS. 1A, 1B, 2A and 2B are now described in greater detail below. As previously discussed, the basic building block of the global producer database consists of publicly available agent databases maintained by each state's department of insurance. This data are maintained and provided to the public in a number of formats and according to a number of rules. This data are used to create the framework or backbone of the global producer database by providing name, address, license type, license termination date and company appointments for a plurality of producers.

A number of extract routines have been developed to use the data as provided by the states. These routines may involve a simple parsing routine or quick jobs written to split data in standard database programs like Access or Monarch, for example. The data provided by some sources may not be in a consistent format in that the data may contain up to four address lines, up to five fields for name, and may be comma delimited, space delimited or simply an ASCII file. Such data formats may require SAS type extract programs to be specifically designed for this data. A few sources may be provided only on paper and will be scanned and fed through an optical character recognition program. To this database is added additional external and internal data to create the global producer database for deriving the scoring model according to a preferred embodiment of the present invention.

According to a preferred embodiment of the present invention, actual historical premiums, loss, and in-force data for a plurality of producers are derived or calculated from the historical producer data from the external data in step 100. Preferably, several years of producers' data are gathered and pooled together in a single database as producer records. Other related information on each producer is also gathered and pooled into the database, e.g., the producer's address including zip code, type of license. This information is used in associating a producer's data with the predictive variables obtained from the external data sources.

External data aggregation is a rapidly expanding field. Numerous vendors are constantly developing new external databases. According to a preferred embodiment of the present invention, the external data sources include, but are not limited to, personal household level demographics from data providers such as Acxiom, Experian or INFO-USA, for example. These data providers offer many characteristics of an individual's household, e.g., income, home owned or rented, education level of the business owner, etc. The individual household level data are based on the individual's name, address, and when available, social security number. Other individual level data sources can also be included, when available. These include an individual's credit report, driving record from Motor Vehicle Records (MVR) which are available from ChoicePoint and other similar data aggregators, for example.

Variables selected from the personal level databases are matched to the data held in the global producer database electronically, based on the name and address of the producer. However, more accurate keyed matches may be employed whenever an external data provider's unique data key is present in the data sources, e.g., a social security number or date of birth is present in the global producer database allowing the data to be matched to a specific record in the external database.

Also included as an external data source is census data that is available from both U.S. Government agencies and third parties vendors, e.g., the EASI product from EASI Analytics, Inc., for example. Such census data are electronically matched to the global producer database based on the producer's individual level zip code. County level data are also available and can include such information as unemployment rates and other economic indicators, etc. Preferably, the individual level zip codes are rolled up to a county level and the global producer database is then matched to the county level data.

Thus, in step 104, several significant external data sources having multiple variables potentially predictive of insurance producer profitability or productivity are identified. Variables are selected from each of the multiple external data sources and matched to the global producer database on a record-by-record basis. The variables from the external data sources are available to be matched to producer data to identify a relationship between the variables (on a per value basis, assuming a variable has more than one value) and insurance producer profitability or productivity, as evidenced by the cumulative ratio or average associated with each value of these in the producer database. As the statistical relationship between the variables and producer data is established, these variables will be considered for inclusion in the development of a model that is predictive of insurance producer profitability or productivity.

There are major classes or types of variables from the external data sources for each producer in the global producer database. These include geographic factors, policy characteristics, producer information and household level information. In the table below, examples of individual variables for each of these classes of variables are listed as might be employed for a producer profitability predictive model:

---
Geographic Factors

Population percent employed
Neighborhood net worth statistics
Business Stability Net income
Commission history
Number of licenses
Sales
Complaints
Policy Characteristics Historical loss experience - P&C
Persistency - Life and P&C
Ratio of Life to P&C premium
State Databases Years since first licensed
Number of appointments
Household Information Education
Number of children
Household income
Home ownership

---

In a preferred embodiment, the matching process for the external data is completely computerized. To facilitate the computerized process, each individual external database has a key associated with each of the records in the particular database. This key exists on each of the records in the global producer database. For external data, e.g., Acxiom, the key is the producer name and address or social security number. For the census data, the unique key is either the county code or the zip code. For state insurance department records, the unique key is the producer license ID number. The keys for each class of external data are set forth in the following table:

---
| | |
|---|---|
| Demographic Factors | zip code |
| Producer Data | company agent ID number |
| Policy Characteristics | company data policy number & agent ID |
| State Agent Data | agent license number |
| Household Data | ssn or name and address |

---

The external data are electronically secured and loaded onto the computer system where the producer data can be accessed. One or more software applications then match the appropriate external data records to the appropriate producer database records. The resulting match produces expanded producer database records with not only historical producer data but matched external data as well. In some cases, the external data vendor may provide the matching function and return completely matched and updated records back to the global producer database.

Next, in step 108, appropriate actuarial modifications or transformations to the data held in the global producer database are completed. Actuarial transformations are required to make the data more useful in the development of the predictive statistical model since much of the data within the producer database cannot be used in its raw form. This is particularly true of the commission, premium, policy in-force and loss data. These actuarial transformations include, but are not limited to, loss ratio calculations by producer grouping for property and casualty coverage and 13-month persistency calculations for life insurance coverage. These are normalized across license types, product lines and marketing organization to produce relevant correlations.

For property and casualty coverage, premium manualization is an actuarial technique that transforms diversely calculated individual policyholder premiums to a common basis that is based upon a standard premium, sometimes referred to as the manual premium. A manual premium is a premium that can be calculated by following the formulae in insurance company manuals or the formulae in insurance industry organizations' published manuals. This is desirable since the actual premium that a policyholder is charged is not entirely the result of a consistent or a quantitative process. More particularly, within any individual insurance company, commercial insurance premiums for a particular policyholder typically can be written by several "writing" companies, each of which may charge a different base premium. Different underwriters will often select different writing companies even for the same policyholder. Additionally, an underwriter may apply credits or debits for individual policies further affecting the base premium. Thus, there are significant qualitative judgments or subjective elements in the process that complicate the determination of a manual premium.

The premium manualization process removes these, and other, subjective elements from the determination of the premium for every policy in the global producer database. As a result, a common base premium may be determined. Such a common basis is required to develop the profitability indications from the data that are necessary to build the predictive statistical model. It may also remove the effect of rate changes throughout the data time periods, as well as the pricing differences between different insurance companies whose data comprise the global producer database.

The global producer database loss data are also actuarially modified or transformed according to a preferred embodiment of the present invention to produce accurate profitability predictions. More specifically, some property casualty insurance coverages have "long tail losses." Long tail losses are losses that are usually not paid during the policy term, but rather are paid a significant amount of time after the end of the policy period. Different commercial coverages have significantly different long tail loss patterns, and these differences can be compensated for through appropriate actuarial modifications. A time limit for such loss development can be selected which is sufficiently mature and will produce an accurate indication of ultimate loss and hence overall profitability. The loss development patterns of the policies in the producer database are analyzed by examining traditional actuarial loss development triangles and associated loss development factors. An experienced actuary uses this information to determine the appropriate development period for a particular coverage line. The actuary should strike a reasonable balance between the loss development maturity of the data and the resultant number of policies available for modeling. For a given set of policies in the producer database, as the required loss development period increases, the number of policies that can be employed correspondingly decreases.

For the life insurance companies, the normalization techniques will transform different classes of insurance by a weighting process used to recognize different persistency patterns from product line to product line. Persistency can vary tremendously with different policy structures. For instance, term coverage has a different persistency expectation than does traditional whole life coverage. In order to normalize the rates, an analysis of actual to expected persistency is performed to normalize lines of business based on these results.

The normalization process removes expected discrepancies from the determination of the ratios for each producer in the database. As a result, a common persistency ratio can be determined. Such a common basis is required to develop the profitability and productivity indications from the data that are used to build the predictive statistical model. It may also remove the effect of economic or competitive conditions throughout the data time periods.

The actuarial modifications produce actuarially sound data that can be employed in the development of the predictive statistical model. As previously set forth, the actuarially modified data have been collectively referred to as "work data" while the actuarially modified premium, loss data and persistency data have been referred to as "premium work data," "loss work data," and "persistency work data," respectively.

In step 112, the loss ratio is calculated for each producer and for each producer's term (product line) in the producer database. As explained above, the loss ratio is defined as the numerical ratio of the loss work data divided by the premium work data. In addition, the lapse rate is also calculated for each producer and for each producer's product line in the producer database.

The loss ratio is an expression of an individual policy's profitability, as it represents that portion of the premium committed to losses. A high loss ratio, perhaps greater than 0.70, is indicative of an unprofitable policy. Similarly, a loss ratio of less than 0.70 could be indicative of a profitable policy. A loss ratio of 0.70 is a typical profitability demarcation for major lines of commercial insurance coverage since insurance companies also have a significant portion of the premium income devoted to non-claim expenses.

In another aspect of the present invention, "frequency," another important dimension of profitability for property and casualty companies, is also calculated. Although the loss ratio is a preferred measure of profitability, frequency is another important measure of insurance profitability. Due to the long tail nature of some insurance coverage losses, as described above in connection with step 108, frequency is often employed as a measurement of, or a proxy for, profitability, as the loss ratio may not be sufficiently developed to provide an accurate measurement of profitability in and of itself.

Frequency is calculated by dividing the policy term total claim count by the policy term premium work data. The definition of a claim count varies in the insurance industry. Some insurance companies count each reported claimant involved in a reported claim as individual claim counts while other companies count only the reported claim regardless of the number of claimants. Additionally, some insurance companies count all reported claims regardless of the amount of loss dollars paid, while others count only reported claims with non-zero payments. The frequency calculation process for the producer database may normalize the data to remove the differences between multiple claim count methods reflected in the producer database.

Hereinafter, loss ratio will be considered as the primary measure of profitability for property and casualty companies. However, it should be understood that frequency measurements of profitability are also included in the development of the system and method according to the present invention and in the measurement of profitability described hereinafter. In addition, the lapse rate will be used as the primary measure of productivity for life companies. Also included are commissions, average policy size, premium per policy and not-taken ratios to name a few.

In step 116, for property and casualty producers, the cumulative loss ratio is calculated for a defined group. The cumulative loss ratio is defined as the sum of the loss work data for a defined group divided by the sum of the premium work data for the defined group. Typical definable groups are based on the major lines of coverage. To calculate the loss ratio for an individual line of coverage, all of the loss work data and premium work data for all producers writing the line of coverage are subtotaled and the loss ratio is calculated for the entire line of coverage.

Similarly, in step 116 for life insurance producers, the average lapse rate is calculated for a defined group. The average lapse rate is based on the average of the persistency work data for a defined group. Typical definable groups are based on the major marketing channels. To calculate the lapse ratio for an individual line of coverage, all of the persistency work data for all producers writing the line of coverage are subtotaled and the average lapse ratio is calculated for the entire line of coverage.

In step 120, a statistical analysis on all of the data in the global producer database is performed. That is, for each external variable from each external data source, a statistical analysis is performed that investigates the relationship of that individual external variable and the cumulative loss ratio for the property casualty producer. For life producers, the average lapse rate is preferably used. Well-known statistical techniques are employed to determine the magnitude and reliability of an apparent statistical relationship between an external variable and cumulative loss ratio or average lapse rate.

In the following table, an illustrative example is provided of the statistical analysis that is performed on the data in the producer database. The specific variable in this example identifies the producers' estimated income. Each column and row has been labeled "A-H" and "1-4", respectively. A description of the attendant statistical analysis follows the table.

| 1 | A | B<br>Producer % | C<br>Prem % | D<br>Exp % | E<br>Freq Rel. | F<br>Freq Rel. | G<br>L.R. Rel. | H<br>L.R. Rel. |
|---|---|---|---|---|---|---|---|---|
| 2 | <50K | 44% | 49% | 51% | 2% | 3% | 1% | 5% |
| 3 | >50K | 22% | 21% | 19% | −6% | −5% | −14% | −11% |
| 4 | No Data | 34% | 30% | 30% | −2% | — | 8% | — |

The variable, "estimated income," can take on three values in this example, each listed in A2-A4. Column B indicates the percentage of producers in the producer database with each value of the variable estimated income. Similarly, column C indicates the percentage of premium those producers represent in the producer database. Column D indicates the associated number of exposures for the same group. Column E indicates the claim frequency on a manualized premium basis, for each value that the variable estimated income could assume in the producer database. Similarly, Column F has the same information but is based on a non-manualized premium, i.e., the actual written premium. Column G indicates the loss ratio relativity based on a manualized premium. Similarly, Column H indicates the same for the actual written premium.

As shown above, the variable, estimated income, suggests that there is some relationship between the variable and insurance profitability. This can be inferred from the fact that both the loss ratio relativity, as well as several other indicators for profitability, are all relatively improved when producers estimated income exceeds $50,000, and conversely as well.

In addition, for each value that an external variable can assume a loss ratio or lapse rate is calculated from the underlying data, which can then be further segmented by a definable group (e.g., major line of coverage). For purposes of illustration, the external variable of "home-ownership" is used. Home-ownership is an external variable, or piece of information, available from Acxiom, for example. It defines whether the physical location of the producer is owned by the producer or rented by the producer. Each individual variable can take on appropriate values. In the case of home-ownership, the values are O=owned and R=rented. (In real world databases, other values, which would be invalid, may also occur; statistical and actuarial techniques are employed to address such errors.) The cumulative loss ratio is calculated for each of these values. For home location, the O value might have a cumulative loss ratio of 0.60, while the R value might have a cumulative loss ratio of 0.80. That is, based on the premium work data and loss work data, owners have a cumulative loss ratio of 0.60 while renters have a cumulative loss ratio of 0.80. From the life insurance line, an average lapse rate with a value of 0.10 for owners and 0.20 for renters is possible.

This analysis may then be further segmented by the major line of coverage. Therefore, for home-ownership, the losses and premiums are segmented by major line of coverage. The cumulative loss ratio for each of the values O and R are calculated by major line of coverage. This is possible since the producer database can differentiate premiums and losses by major line of coverage.

As an example, consider the variable "major-line-of-coverage" in the global producer database. It can take on the values of 1-3, representing respectively, term, permanent, and annuity lines of life insurance business. Furthermore, the following expanded example illustrates how home-ownership can be analyzed by major line of coverage.

| Home-ownership | Term | Permanent | Annuity | In Total |
| --- | --- | --- | --- | --- |
| Owned | 0.10 | 0.11 | 0.09 | 0.10 |
| Rented | 0.30 | 0.19 | 0.11 | 0.20 |
| Total | 0.20 | 0.15 | 0.10 | 0.15 |

In the example above, insights can be made into the potential value that the variable home-ownership may have in relation to life insurance productivity as expressed by the average lapse rate. In this example, home-ownership appears to have the most potential value and consideration for the major line of coverage of term insurance.

In step 124, a review is made of all of the outputs derived from previous step 120. This review is based, in part, on experience and expertise in judging what individual external variables available from the external data sources should be considered in the creation of the statistical model that will be used to predict the future profitability or productivity of an individual producer.

In order to develop a robust system that can predict insurance producer profitability and productivity on a per producer basis, it is desirable to include only those individual external variables that, in and of themselves, can contribute to the development of the model (hereinafter "predictor variables"). In other words, the individual external variables under critical determination in step 124 should have some relationship to profitability and productivity, i.e., loss ratio, lapse rate; and in the best judgment of the statisticians and actuaries, be reasonably causally related in the real world.

In the above example of home-ownership, it is apparent from the average lapse rates described above, i.e., the O value (0.10) and the R value (0.20), that home-ownership may in fact be related to productivity and therefore may be considered a predictor variable.

As might be expected, the critical determination process of step 124 becomes much more complex as the number of values that an individual external variable might assume increases. Using an "estimated-income" variable as an example, this individual external variable can have values that range from 0 to some high value, say 1,000,000, with all of the numbers in between as possible values. In order to complete the critical determination of such an individual external variable, it is preferably viewed in a particular manner conducive to such a critical determination, so that the highly experienced actuary and statistician can make the appropriate critical determination of its efficacy for inclusion in the development of the predictive statistical model.

A common statistical method, called binning, is employed to arrange similar values together into a single grouping, called a bin. In the estimated-income individual data element example, ten bins might be produced, each containing a range of values, e.g., bin 1 equals values 0-20,000, bin 2 equals values 20,001-40,000, and so on. The binning process, as described, yields ten surrogate values for the estimated-income individual external variable. The critical determination of the estimated-income variable can then be completed by the experienced actuary and statistician.

The cumulative loss ratio or average lapse rate of each bin can be considered in relation to the cumulative loss ratio or average lapse rate of each other bin, and the overall pattern of cumulative loss ratios or average lapse rates considered together. Several possible patterns might be discernable. If the values of the individual bins are arranged in a generally increasing or decreasing pattern, then it is clear to the experienced actuary and statistician that the bins, and hence the underlying individual data elements comprising them, could be related to insurance profitability and productivity, and therefore, should be considered for inclusion in the development of the statistical model.

Likewise, where values of the cumulative loss ratio or average lapse rates from bin to bin exhibit an erratic pattern (e.g., a saw-toothed pattern), and do not display any general direction or trend, they usually do not offer any causal relationship to insurance profitability or productivity, and hence, are preferably not considered for inclusion in the development of the predictive statistical model. Other patterns, some very complicated and subtle, can be discerned only by the trained and experienced eye of the actuary or statistician specifically skilled in this work.

Thereafter, in step 128, the predictor variables from the various external data sources that pass the review in prior step 124 are examined for cross-correlations. Suppose, for example, two different predictor variables, "years-in-business" and "producers-age", are compared one to another. Since each of these predictor variables can assume a wide range of values, assume that each has been binned into five bins (as discussed above). Furthermore, assume that as the value of years-in-business increases from bin to bin, the value of producers' age increases in a like, proportional manner.

This type of variable-to-variable comparison is referred to as a correlation analysis. In other words, this analysis is concerned with how "co-related" individual pairs of variables are in relation to one another.

All individual variables are preferably compared to all other individual variables in such similar fashion. A master matrix is prepared that has the correlation coefficient for each pair of predictor variables. The correlation coefficient is a mathematical expression for the degree of correlation between any pair of predictor variables. Its value ranges from $-1$ to $+1$, with $-1$ being a perfectly negative correlation, $+1$ being a perfectly positive correlation, and 0 being no correlation. Therefore, the greater the absolute value of the correlation coefficient, the greater the degree of correlation between the pair of individual variables.

The experienced and trained actuary or statistician reviews the matrix of correlation coefficients. The review will seek to identify those pairs of predictor variables that are highly correlated with one another. Once identified, the real world meaning of each predictor variable is evaluated. In the example above, the real world meaning of years-in-business and producer-age may be well understood. One reasonable causal explanation why this specific pair of predictive external variables might be highly correlated with one another would be that the older the producer, the longer the producer has been in business.

The goal of the correlation study is to eliminate highly repetitive variables. The skilled actuary or statistician compares each variable with every other variable, and examines the correlation coefficient for each pair. If the correlation is too high for a pair, one of the variables is considered for removal, but not both. In general, variable pairs with a correlation coefficient of 0.6 are reviewed, while a variable pair with a correlation coefficient over 0.8 would warrant serious consideration for elimination of one of the variables. Again, the experienced and trained actuary or statistician would consider the real world meaning of any and all variables considered for elimination to ensure that the underlying correlation is causally related in the external world, and not just acausally statistically related.

The actuary or statistician then can make a trained decision to potentially remove one of the two predictor variables, but not both. Such a decision would weigh the degree of correlation between the two predictor variables and the real world meaning of each of the two predictor variables.

As shown in FIG. 2A, in step 200, the portion of the global provider database that passes through all of the above pertinent steps, which includes the predictor variables, is preferably subdivided into three separate data subsets, namely, the training data set, the testing data set and the validation data set. Different actuarial and statistical techniques can be employed to develop these three data sets from the global provider database. They include a random splitting of the data and a time series split. The time series split might reserve the most recent few years of historical data for the validation data set, and the prior years for the training and testing data sets. Such a final determination is preferably made in the expert judgment of the actuary and statistician. The three data sets are utilized as follows:

1. Training Data Set

The development process to construct the predictive statistical model requires a subset of the data to develop the mathematical components and coefficients of the statistical model. This subset of data is referred to as the training data set.

2. Testing Data Set

At times, the process of developing these mathematical components can actually exceed the actual relationships inherent in the data, and overstate such relationships. As a result, the coefficients that describe the mathematical components can be subject to error. In order to monitor and minimize the overstating of the relationships, and hence the degree of error in the coefficients, a second data subset is preferably subdivided from the producer database, and is referred to as the testing data set.

3. Validation Data Set

The third subset of data, the validation data set, functions as a final determination of the degree of predictiveness of profitability or productivity that the mathematical components of the system can be reasonably expected to achieve on a go forward basis. Since the development of the coefficients of the predictive statistical model are influenced during the development process by the training and testing data sets, the validation data set provides an independent, non-biased estimate of the efficacy of the predictive statistical model.

The actual construction of the predictive statistical model involves sub-steps 204A and 204B, as shown in FIG. 2A. More particularly, in sub-step 204A, the training data set is used to produce an initial statistical model. There are numerous statistical methods that may be employed to produce the initial statistical model. These may include multivariate methods, e.g., multiple regression, generalized linear modeling and the like, clustering algorithms, decision tree techniques, and any one of the known neural network algorithms. The family of multivariate methods, which includes several neural network algorithms, is herein employed to describe the initial statistical model. The initial statistical modeling process itself further eliminates potential predictor variables. Standard statistical methods are employed to determine the optimum set of predictor variables that will provide for the most predictive model. The statistical power or predictiveness of an individual model is determined by both its degree of predictiveness and its stability of prediction over time, as evidenced by the model's efficacy on the validation data set.

The initial statistical model results in a mathematical equation that produces coefficients for each of the individual selected predictor variables in the training data, and that relates those individual variables to profitability or productivity, which is represented by the loss ratio or lapse rate of each individual policyholder's record in the training database. The coefficients represent the independent contribution of each of the predictor variables to the overall prediction of the dependent variable, i.e., the insurance profitability or productivity as represented by the loss ratio or lapse rate.

Several different statistical techniques are employed in substep 204A. Conventional multiple regression is the first technique employed to produce an initial model. The second technique employed is generalized linear modeling. In some instances this technique is capable of producing a more precise set of coefficients than the multiple regression technique. The final technique employed is a type of neural network, i.e. backwards propagation of errors or "backprop" for short.

Backprop is capable of even more precise coefficients than generalized linear modeling. Backprop can produce nonlinear curve fitting in multi-dimensions, and as such, can operate as a universal function approximator. Due to the power of this technique, the resulting coefficients can be quite precise, and as such, yield a strong set of relationships to profitability or productivity, i.e., loss ratio or lapse rate.

In sub-step 204B, the testing data set is used to evaluate if the coefficients from sub-step 204A have "overfit" the training data set. No data set that represents real world data is perfect; every such real world data set has anomalies and noise in the data (i.e., statistical relationships that are not representative of external world realities). Overfitting can result when the statistical technique employed results in coefficients that not only map the relationships between the individual variables in the training set to profitability, but also begin to map the relationships between the noise in the training data set and profitability. When this happens, the coefficients are too fine-tuned to the eccentricities of the training data set. The testing data set is used to determine the extent of such an overfitting. Since it is highly unlikely that the noise in the training data set will be identical to the noise in the testing data set, the testing data set can be used in such an evaluative manner.

The development process of the predictive statistical model generates the mathematical formula's coefficients and is iterative between sub-steps 204A and 204B. A set of coefficients is developed in sub-step 204A, and that process is halted. The set of coefficients is evaluated for predictiveness on the testing data set, i.e., in sub-step 204B. This halting and evaluation process is repeated until the predictiveness of the current set of coefficients on the testing data set begins to degrade. At that point, the coefficients from sub-step 204A have begun to describe the noise of the training data set that is not present in the testing data set, and the iterative process can be stopped. The coefficients that correspond to this final point in the mathematical development process represent the coefficients of the final system.

One example of the form of such a simplified equation might be as follows: $a_0 + a_1 x_1 + a_2 x_2 + \ldots a_n x_n = y$. In this example, the "a's" are the coefficients, the "x's" are the individual predictor variables, and "y" is the score, i.e., the indication of insurance producer profitability or productivity. The "$a_0$" is the mathematical "y-intercept." For illustrative purposes, consider the following simple example where each variable listed below is multiplied by its corresponding coefficient:

| Predictor Variables | Variable Value | X Coefficient | =Result |
|---|---|---|---|
| Net worth indicator | 3 | 2 | 6 |
| Bankruptcy | 0 | −3 | 0 |
| Home-ownership | 1 | 12 | 12 |
| Home-value | 24 | 1.5 | 36 |
| Vehicle type | 4 | 2 | 8 |
| Marital status | 1 | 10 | 10 |
| Education | 3 | 2 | 6 |
| $a_0$ = y-intercept | | | 2.5 |
| total sum | | | 80.5 |

In this example, the actual value of each predictor variable is multiplied by each predictor variable's coefficient value, and each of those multiplicative results are summed, including the $a_0$ (y-intercept), to produce the statistical model's score.

The final predictive statistical model employs the validation data set as a final independent determination of the degree of predictiveness of the system, as described in steps 208, 212, 216 and 220. Since the iterative nature described above results in the final coefficients being influenced by both the training and testing data sets, it is desirable to ascertain the final efficacy of the coefficients on a separate independent, nonbiased data set, i.e., the validation data set.

In step 208, each record in the validation data set is scored by the predictive statistical model that was completed in sub-steps 204A and 204B. In step 212, the score is attached to each record in the validation data set. The validation data set is then sorted by the score, from lowest to highest score. The validation sample can be divided into ten regions of equal size, i.e., deciles, but other sizes can be employed. Thereafter, in step 216, the cumulative loss ratio or average lapse rate of each decile for the validation data set is then calculated from the work data derived in step 108. The low scores are associated with low values of predicted profitability or loss ratio/lapse rate, and, therefore, indicative of more profitability. Likewise, the high scores are associated with high values of predicted profitability or loss ratio/lapse rate, and therefore, indicative of less profitability.

As further shown in FIG. 2B, the loss ratio relativity of each decile is then calculated in step 220. The loss ratio relativity of each decile is defined as the cumulative loss ratio of the decile minus the cumulative loss ratio of the entire validation data set and that result is then divided by the cumulative loss ratio of the entire validation data set. For example, if the overall loss ratio of the validation data set is 0.80, i.e., 80 cents of every premium dollar was used to pay claims, and if the cumulative loss ratio of decile 1 is 0.60, then decile 1's loss ratio relativity is −25%=(0.60−0.80)/0.80. The process for calculating the average lapse rate is similar.

In step 224, the final step, the predictive statistical model is used to score new or existing producers in order to predict the future profitability or productivity of insurance sales for each new or existing producer. To accomplish the go forward scoring of new or existing producers, the external data used by the statistical model (i.e., the predictor variables) are accessed from the particular external data source. This data are electronically sent to the system of the present invention. These may include external data such as Dun & Bradstreet, zip code census, and the like as previously detailed. The values of these individual variables employed by the system, once secured, are then inserted into the mathematical formula that comprises the statistical model developed in sub-steps 204A and 204B (and as modified, if appropriate, during step 208). The coefficients are typically multiplied by the values of the individual variables, and other required formula calculations are also completed. In this manner, a score is generated by the system for a new or existing producer record.

The pertinent decile from step 212 into which this particular producer record score falls, is then determined. This is accomplished by examining the lowest and highest validation data set score for each decile, and determining into which decile the new producer record score falls. The loss ratio relativity of that corresponding decile, or other similarly developed score range sized grouping, represents the system's insurance producer profitability or productivity prediction.

The magnitude of the loss ratio relativity associated with the appropriate decile indicates the size or amount of the insurance producer profitability prediction. The sign, either positive or negative, of the loss ratio relativity associated with the appropriate decile indicates whether the predicted insurance profitability is either positive or negative. If the sign is negative, then the loss ratio is relatively less than the overall average, and hence, more profitable. If the sign is positive, then the loss ratio is relatively more than the overall average, and hence, less profitable. The associated magnitude of the corresponding decile's loss ratio relativity indicates the degree in each case, as noted above. The same indications above apply if the average lapse ratio is the predicted variable.

With the insurance producer profitability system completed, there are a variety of different options that different purchasers (e.g., insurance carriers) might choose to have access to the score producing, predictive statistical model.

A purchaser might require a system including the predictive statistical model to be installed on its computer systems. In this case, the system, which has been encoded into software, is loaded on a custom installation basis into the purchaser's computer environment. The appropriate network programs can be constructed to enable the automatic querying of the requisite external data (e.g., Acxiom) to interface with the system.

Alternatively, a purchaser might transmit a single producer, or a batch of many producers to be scored off-line and off-site by a third party who offers such an insurance producer profitability scoring capability using the predictive statistical model as described.

A purchaser might be desirous of Internet based access. This is a variation of the immediately preceding description. Such a purchaser connects on-line to the Internet, in a known manner, and inputs the name and address of the producer requiring an insurance producer profitability score from the system. The system is preferably web-enabled and is capable of scoring such queries and returning the appropriate score.

In another aspect of the present invention, the raw global producer database, starting with the state agent database, can be used as a provider of important recruiting information and as a screening resource. By a normal statistical analysis of the agent records, a company can easily determine new markets to enter. By using the database tool for census analysis, a list of agents who fit demographic parameters that make up a target market can be easily identified. The data from the global producer database can also be used as a tool for reconciling information provided by a potential applicant. This is very important as companies struggle with methods needed to perform background checks and complying with onerous state regulations.

The database can be used as a standalone product. The database will also relate to the scoring in that many of the fields from the database will be used to determine which variables, of which hundreds may be in the database, will be significant in the development of the scoring model. The database will have, for instance, the producers' home-ownership status.

As stated above, and as should be appreciated from the foregoing detailed description, the present invention has application outside of the insurance industry and licensed insurance professionals. The following table indicates some of the professions that can benefit from the present invention. The first column indicates the profession of the licensed professional being modeled in accordance with the present invention. The second column, Profitability Indicator, shows one of the potential business measures that would indicate profitability to the employer or company that uses the licensed professional's services. The third column, Sales Indicator, shows a typical method of measuring gross sales. The last column, Personal Wealth, provides a way to measure the income level for the licensed professional being modeled. The example used in the foregoing detailed description of the invention was that of the Property & Casualty Insurance Agent and the Life Insurance Agent.

| Profession | Profitability Indicator | Sales Indicator | Personal Wealth |
| --- | --- | --- | --- |
| Property & Casualty Insurance Agent | Loss Ratio | Premium Income | Commission |
| Life Insurance Agent | Persistency Rate | Policies Sold | Commission |
| Financial Services Broker/Dealer | Product Retention | New Sales | Asset Under Management |
| Loan Broker | Default Rate | Loan Applications | Total Loan Value |
| Mortgage Broker | Number of applications | Closed mortgages | Commissions |
| Real Estate Agent | Total Listings | Closed properties | Commissions |
| Financial Advisor/Planner | Asset Retention | New clients | Assets under control |
| Accountant/Financial Advisor | Client Retention | Increase in Asset | Management fees |

Accordingly, the present invention provides a global producer database and licensed professional scoring system and method which can be used to predict individual licensed professional profitability and productivity on a prospective basis based on data from data sources external to a particular company and, when available, traditional data sources, e.g., internal company information and business practices of a particular company.

It will thus be seen that the objects set forth above, among those made apparent from the preceding description, are efficiently attained and, since certain changes may be made in carrying out the above method and in the constructions set forth for the system without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method for determining the prospective profitability and productivity of a licensed professional, the method comprising the steps of: obtaining first data concerning a selected licensed professional from at least one source of said first data; obtaining historical data concerning a plurality of licensed professionals from at least one source of said historical data; obtaining external data from at least one external data source including variables predictive of at least one of profitability and productivity of said licensed professionals; utilizing a data processing device, normalizing said historical data using actuarial transformations to generate working data; utilizing said data processing device, calculating a profitability ratio associated with each of said plurality of licensed professionals based on said working data; utilizing said data processing device, calculating a cumulative ratio associated with said external data source variables based on said working data; identifying statistical relationships between said cumulative ratio and said external data source variables; creating a statistical model utilizing ones of said variables; generating an overall prediction of at least one of profitability and productivity of said licensed professionals; and utilizing said data processing device, generating a score for said selected licensed professional indicative of at least one of profitability and productivity using said statistical model.

2. The method according to claim 1, wherein individual ones of said variables each have at least two values.

3. The method according to claim 1, wherein said at least one source of first data includes government databases.

4. The method according to claim 1, wherein said at least one source of historical data includes at least one of government databases, industry organization databases and internal company databases.

5. The method according to claim 1, wherein said at least one external data source includes at least one of government databases and proprietary databases of independent data providers.

6. The method according to claim 1, further comprising the step of storing said first data, said historical data and said external data in a relational database.

7. The method according to claim 1, wherein said working data are associated with said at least one external data source to identify said variables predictive of at least one of profitability and productivity of said licensed professionals.

8. The method according to claim 1, wherein said step of calculating a cumulative ratio associated with said variables based on said working data is effected for a defined group of said licensed professionals.

9. The method according to claim 8, wherein said defined group of said licensed professionals includes licensed professionals who fall within a preselected range of at least one of profitability and productivity.

10. The method according to claim 8, wherein said step of identifying statistical relationships includes statistically analyzing said cumulative ratio associated with said defined group of said licensed professionals and said variables.

11. The method according to claim 1, further comprising the steps of examining said variables for cross-correlation, and discarding at least one of said variables from each set of cross-correlated variables.

12. The method according to claim 1, wherein said step of creating a statistical model includes allocating said historical data and external data from said at least one external data source into data subsets including at least one of a training data subset, a test data subset and a validation data subset.

13. The method according to claim 12, wherein said step of allocating said data and said external data into data subsets is effected on at least one of (i) a random basis and (ii) a non-random basis.

14. The method according to claim 12, further comprising the step of using said training data subset to commence said step of creating said statistical model.

15. The method according to claim 14, wherein said step of using said training data subset to commence said step of creating said statistical model is effected using multivariate statistical methods including at least one of multiple regression, generalized linear modeling, clustering algorithms and neural network algorithms.

16. The method according to claim 12, further comprising the step of iteratively using said test data subset to evaluate the efficacy of and to refine said statistical model during said step of creating said statistical model.

17. The method according to claim 12, further comprising the step of using said validation data subset to test said statistical model.

18. The method according to claim 17, wherein said validation data subset includes at least one record, and wherein said step of using said validation data subset to test said statistical model includes assigning a score to each record of said at least one record of said validation data subset, sorting said at least one record by said score into groupings of equal size, calculating a cumulative profitability ratio for each of said groupings using said working data, and calculating a ratio relativity for each of said groupings.

19. The method according to claim 18, further comprising the step of gauging said score generated for said selected licensed professional indicative of at least one of profitability and productivity using said statistical model against said ratio relativity for each of said groupings to yield a prediction as to at least one of profitability and productivity of said selected licensed professional.

20. A program storage device readable by a machine and tangibly embodying a program of instructions executable by the machine to perform a method for determining the prospective profitability and productivity of a licensed professional, the method comprising the steps of: obtaining first data concerning a selected licensed professional from at least one source of said first data; obtaining historical data concerning a plurality of licensed professionals from at least one source of said historical data; and obtaining external data from at least one external data source including variables predictive of at least one of profitability and productivity of said licensed professionals; normalizing said historical data using actuarial transformations to generate working data; calculating a profitability ratio associated with each of said plurality of licensed professionals based on said working data; calculating a cumulative ratio associated with said external data variables based on said working data; creating a statistical model utilizing selected ones of said external data variables having statistical significance based on statistical relationships between said cumulative ratio and said external data source variables; and generating a score for said selected licensed professional indicative of at least one of profitability and productivity using said statistical model.

21. The program storage device according to claim 20, wherein individual ones of said variables each have at least two values.

22. The program storage device according to claim 20, wherein said at least one source of said first data includes government databases.

23. The program storage device according to claim 20, wherein said at least one source of said historical data includes at least one of government databases, industry organization databases and internal company databases.

24. The program storage device according to claim 20, wherein said at least one external data source includes at least one of government databases and proprietary databases of independent data providers.

25. The program storage device according to claim 20, further comprising storing said first data, historical data and external data is a relational database.

26. The program storage device according to claim 20, wherein said working data are associated with said at least one external data source to identify said variables predictive of at least one of profitability and productivity of said licensed professionals.

27. The program storage device according to claim 20, further comprising discarding at least one of said variables from each set of cross-correlated external data variables.

28. The program storage device according to claim 20, further comprising allocating said historical data and said external data into data subsets including at least one of a training data subset, a test data subset and a validation data subset.

29. The program storage device according to claim 28, further comprising creating an initial statistical model utilizing said training data subset.

30. The program storage device according to claim 29, wherein creating an initial statistical model utilizes multivariate statistical methods including at least one of multiple regression, generalized linear modeling, clustering algorithms and neural network algorithms.

31. The program storage device according to claim 28, further comprising iteratively evaluating the efficacy of and refining said statistical model.

32. The program storage device according to claim 28, further comprising testing said statistical model utilizing said validation data subset.

33. The program storage device according to claim 32, wherein said validation data subset includes at least one record, and further comprising: assigning a score to each record of said at least one record of said validation data subset; sorting said at least one record by said score into groupings of equal size; calculating a cumulative profitability ratio for each of said groupings using said working data; and calculating a ratio relativity for each of said groupings.

34. The program storage device according to claim 33, further comprising gauging said score generated for said selected licensed professional indicative of at least one of profitability and productivity using said statistical model against said ratio relativity for each of said groupings to yield a prediction as to at least one of profitability and productivity of said selected licensed professional.

* * * * *